US008914859B2

(12) United States Patent
Erickson et al.

(10) Patent No.: US 8,914,859 B2
(45) Date of Patent: Dec. 16, 2014

(54) MANAGING THE PROGRESSIVE LEGIBLE OBFUSCATION AND DE-OBFUSCATION OF PUBLIC AND QUASI-PUBLIC BROADCAST MESSAGES

(75) Inventors: Thomas D. Erickson, Minneapolis, MN (US); David W. Levine, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 13/290,533

(22) Filed: Nov. 7, 2011

(65) Prior Publication Data
US 2013/0117830 A1    May 9, 2013

(51) Int. Cl.
*H04L 29/00* (2006.01)
*H04L 29/06* (2006.01)
*H04W 12/02* (2009.01)
*H04W 4/06* (2009.01)
*H04W 48/12* (2009.01)
*H04W 4/20* (2009.01)

(52) U.S. Cl.
CPC .............. *H04L 63/0428* (2013.01); *H04W 4/06* (2013.01); *H04W 48/12* (2013.01); *H04W 12/02* (2013.01); *H04W 4/206* (2013.01)
USPC ............... 726/6; 380/247; 380/248; 380/249; 380/250; 713/155; 713/156; 713/157; 713/158; 713/159

(58) Field of Classification Search
CPC combination set(s) only.
See application file for complete search history.

(56) References Cited

U.S. PATENT DOCUMENTS

| 7,644,127 | B2 | 1/2010 | Yu |
| 7,970,845 | B2 | 6/2011 | Yu |
| 2004/0221062 | A1 | 11/2004 | Starbuck et al. |
| 2005/0060643 | A1 | 3/2005 | Glass et al. |
| 2007/0113101 | A1* | 5/2007 | LeVasseur et al. ............ 713/189 |
| 2009/0025063 | A1 | 1/2009 | Thomas |
| 2009/0300774 | A1* | 12/2009 | Makkinejad ..................... 726/27 |
| 2010/0088380 | A1 | 4/2010 | Starbuck et al. |
| 2010/0250497 | A1 | 9/2010 | Redlich et al. |
| 2011/0009086 | A1 | 1/2011 | Poremba et al. |
| 2011/0247081 | A1 | 10/2011 | Shelton |
| 2012/0066769 | A1* | 3/2012 | Latchem et al. ................ 726/26 |

OTHER PUBLICATIONS

Parris, I.—et al.; "Privacy-enhanced social network rooting in opportunistic networks"; 8th IEEE Intern'l Conference on Pervasive Computing & Communication Workshops(PERCOM)—pp. 624-629; 2010.

(Continued)

*Primary Examiner* — Ghazal Shehni
(74) *Attorney, Agent, or Firm* — Scully, Scott, Murphy & Presser, P.C.; Louis J. Percello, Esq.

(57) ABSTRACT

Obfuscating a message, in one aspect, may include detecting sensitive information in a message to be broadcast into public or quasi-public computer network environment; replacing the sensitive information in the message with a representation that preserves general aspects of the sensitive information and a user interface element, the user interface element for enabling a viewer of the message to request access to details of the sensitive information; and transmitting the replaced message for broadcasting into the public or quasi-public computer network environment. De-obfuscating the message, in one aspect, may include authenticating one or more viewers or receivers of the message and based on the authentication, presenting details associated with the sensitive information.

25 Claims, 7 Drawing Sheets

(56) References Cited

OTHER PUBLICATIONS

Binsalleeh, H.—et al.; "On the analysis of the ZeusBotnet Crimeware Toolkit"; Privacy, Security & Trust (PST) 8th Annual Intern'l Conference; pp. 31-38; Aug. 17-19, 2010.

ETSI; "Access, Terminals, Transmission and Multiplexing (ATTM): Integrated Broadband Cable and Television Networks; K-LAD Functional Specification"; ETSI Technical—Specification; ETSI TS103162 v1.1.1 (Oct. 2010); www.etsi.org . . . ; 2010.

International Search Report dated Sep. 17, 2012 received in a corresponding foreign application.

* cited by examiner

MANAGING THE PROGRESSIVE LEGIBLE OBFUSCATION AND DE-OBFUSCATION OF PUBLIC AND QUASI-PUBLIC BROADCAST MESSAGES

FIELD

The present application relates generally to computers, and computer applications, and more particularly to managing messaging in public and/or quasi-public broadcast.

BACKGROUND

The public or quasi-public real time distribution of messages has become an increasingly popular mode of communication. Thus, microblogging applications like Twitter™ support the public broadcast of short textual messages; social networking applications support the posting of status messages that are made available to large social networks; and geo-locative applications like FourSquare™ allow its users to "check in" to places, and broadcast their locations. Regardless of the application, the basic idea is that a message is made available to a very large set of people who can use various methods to tune into the subset of messages that interest them.

Messages broadcast in this way have a variety of uses. For instance, it has been observed that in public emergencies many people broadcast requests for help or reports of a problem at a particular time and place. For instance, a person in need of help may report that the street in front of her house is flooded and water is coming in the basement. For the purposes of this discussion it is useful to think about recipients of a broadcast message falling into three classes:

There may be potential respondents who can respond to the message in a way that is useful to the sender, those who may see the person's message and come over to help; or, personnel from the local volunteer fire department may respond in the same way.

There may be potential beneficiaries who can profit from the information, but who cannot provide a response that is useful to the sender. Personnel who work for public transit may re-route a bus away from the street that has been reported as flooding.

There may be potential routers who see the message and who have the knowledge and ability to bring it to the attention of additional potential respondents and/or potential beneficiaries.

A broadcast message has visibility to a wide array of people, who may respond to it in different ways, for instance, by assisting the sender, deriving some other value, or forwarding the message. Consider more closely the potential beneficiaries—those whose receipt of the message will not benefit the sender. There may be two cases in the above example. The first case is when the value that the potential beneficiary gains from the message does not harm the sender. For example, a publicly broadcast message about a particular problem may, in combination with many such requests from different points in a city, provide a valuable picture of the situation.

Knowing the distribution of reports of flooding or power outages may help emergency responders identify districts that have been hit particularly hard, and that may need extra support, equipment, or attention to its infrastructure. Similarly, such messages may help individuals in the same areas prepare for or diagnose similar situations.

Although this does not help the sender of the message, it does contribute to the public good. On the other hand, some potential beneficiaries may derive value from a message that results in harm to its sender. A public message saying that the electricity is out at 111 Eleventh Street may bring help from the utility company, but it may also attract looters. A report of an accident at 5th and Main may bring an ambulance, but it may also attract onlookers who cause a traffic jam and impede the ambulance. And so on.

In this sense, certain categories of information—location information, time information, personal identity information—are likely to be sensitive. There are several approaches to countering the effects of disclosing sensitive information. One is simply to not broadcast it. However, this approach quashes any public good that can be obtained by public beneficiaries, and also lowers the likelihood that it will be seen and acted upon by potential routers, making the sender less likely to benefit from it. A second approach is to hide the sensitive information from public view by, for example, encrypting it. In such a scenario, intended recipients might be supplied in advance with means of decrypting such messages. This approach has at least two drawbacks. First, it requires advance preparation (e.g., learning about and obtaining encryption keys), which is logistically complicated for the sorts of broad public uses illustrated above in the crisis response scenario. Second, hiding the sensitive information means that many potential beneficiaries would not benefit and potential routers would not know who the messages ought to be routed to.

Therefore, the present disclosure recognizes that a need exists for a way of protecting sensitive information in publicly transmitted messages without completely hiding it. The present disclosure demonstrates a method of progressive obfuscation and de-obfuscation of public messages.

BRIEF SUMMARY

A method for obfuscating elements in a message, in one aspect, may include detecting one or more sensitive information elements in a message to be broadcast into public or quasi-public computer network environment. The method may also include replacing said one or more sensitive information elements in the message with a representation that preserves a general aspect of said one or more sensitive information elements and a user interface element for enabling a receiver of the message to request access to details of said one or more sensitive information elements. The method may further include broadcasting the replaced message into the public or quasi-public computer network environment.

A system for obfuscating elements in a message, in one aspect, may include an accounts module operable to generate credentials for users and register the users with associated credentials. An obfuscating module may be operable to generate an obfuscated form of the message by replacing one or more sensitive information elements in the message with a representation that preserves a general aspect of said one or more sensitive information elements and a user interface element for enabling a receiver of the message to request access to details of said one or more sensitive information elements. A de-obfuscating module may be operable to receive a request from one or more receivers for details of said one or more sensitive information elements via the user interface element. The de-obfuscating module may be further operable to authenticate said one or more receivers, and further operable to present details of said one or more sensitive information elements to said one or more receivers if said one or more receivers are authenticated.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one embodiment of the present disclosure, a message to be broadcast, for instance, publicly, e.g., to a venue like Twitter™ or Facebook™, may be pre-processed in such a way that sensitive information (e.g., location) is legibly obfuscated (i.e., replaced with meaningful but less detailed information, e.g., that will be publicly visible and understandable) and that then permits the message to be de-obfuscated by those with appropriate credentials. In the present disclosure, sensitive information may include any information specified or predetermined to be sensitive by one or more users or providers of the techniques disclosed in the present disclosure. Examples may include full address, telephone number, a person's name, specific medical condition, specific time, and others.

Figure 1:
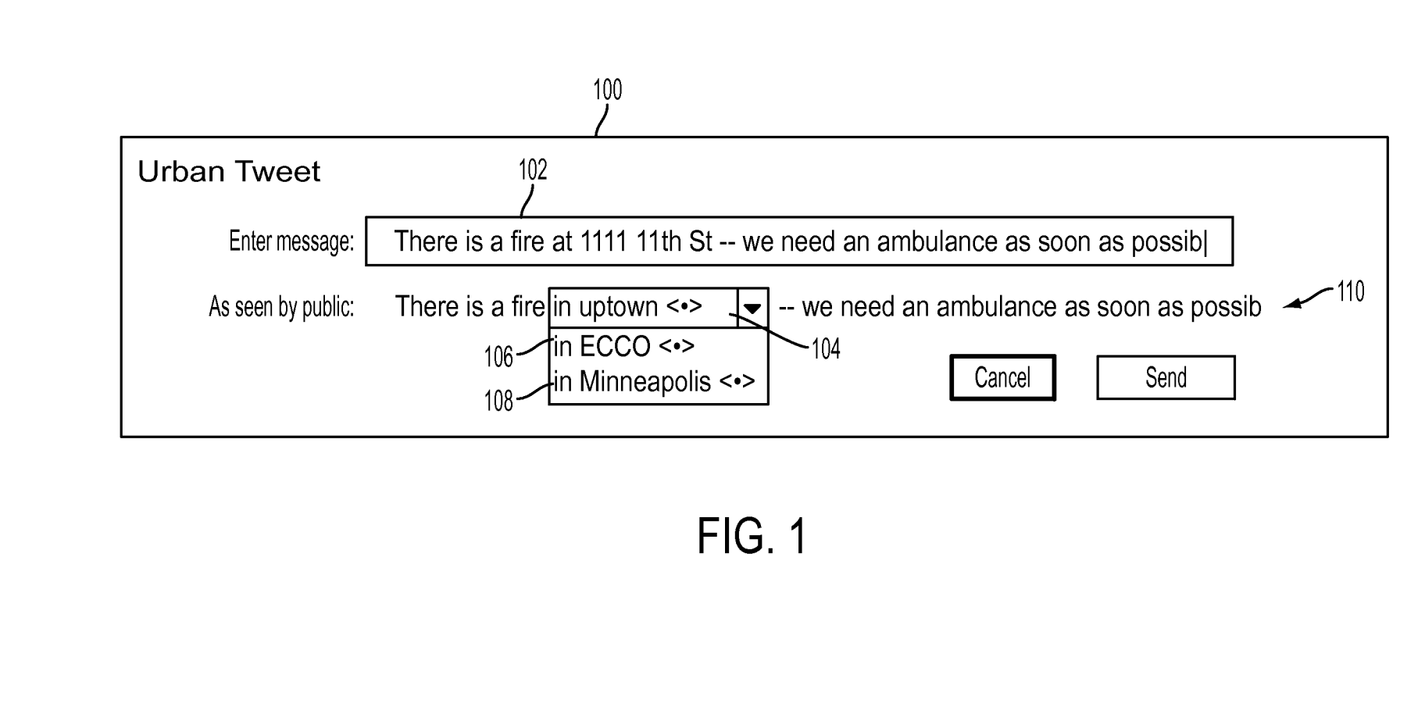
FIG. 1 illustrates an example user interface for location obfuscation in broadcast messaging in one embodiment of the present disclosure.

In one embodiment of the present disclosure, a special client—customized for a particular geographic area by having a hierarchy of spatial legible obfuscating terms into which particular points index—is used to generate broadcast messages. An example of a progressive legible obfuscation may be "1111 11th St ->ECCO Neighborhood ->Uptown district ->south Minneapolis ->Minneapolis." Another example may pertain to an identity of a person, e.g., "first name last name ->a resident of ECCO ->a resident of south Minneapolis". Yet another example may pertain to time, e.g., "2:12 pm ->around 2 pm ->this afternoon ->June 23$^{rd}$" These examples obfuscate detailed information ("1111 11$^{th}$ St" pertaining to an address, "first name last name" pertaining to a person's identify, "2:12 pm" pertaining to time) with more generalized information, e.g., one or more of the generalized terms in the progressive legible obfuscation hierarchy. FIG. 1 illustrates an example user interface for location obfuscation in broadcast messaging in one embodiment of the present disclosure. As the message is entered at 102 the client (software) identifies location references, and maps them to terms in the spatial location legible obfuscation hierarchy (104, 106, 108). A simultaneous obfuscated version of the to-be-broadcast message is shown 110, and the user has the option of adjusting the level (104, 106, 108) of obfuscation.

In the present disclosure, misuse of sensitive information may be prevented without having to eliminate the entire value of broadcast messaging. The pre-processing of the sensitive information includes legibly obfuscating the information, facilitating creating messages that 'generalize' sensitive information and making it easy for authorized personnel to unpack it, while still allowing unauthorized users to get some value out of it, for example, because the obfuscated or modified portion is still meaningfully related to the original message element, albeit in a generalized fashion.

In one aspect, the pre-processing may be performed via a special client software or application, which may be provided as part of a portal (e.g., City portal or other web application portal) that enables users to author a broadcast message, providing a location-based obfuscation hierarchy to aid authoring.

Figure 2:
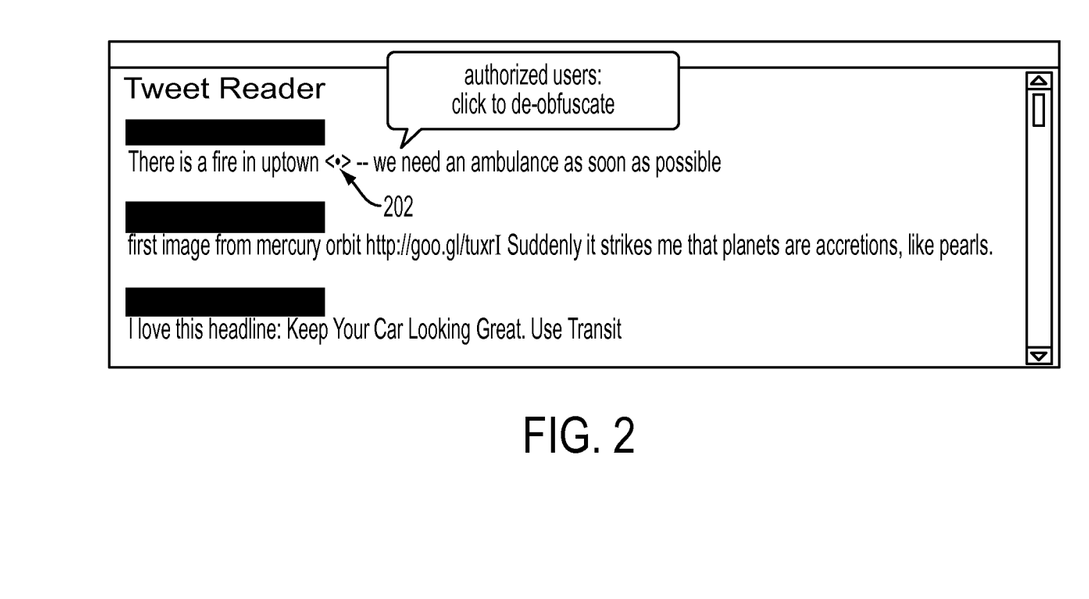
FIG. 2 illustrates an example user interface for de-obfuscating an obfuscated message with a link in one embodiment of the present disclosure.

In one embodiment of the present disclosure, when the message is broadcast it shows up in clients able to read broadcast messages with a link that allows the reader to request a de-obfuscated version. For example, recipients see a message with an embedded link for de-obfuscation. FIG. 2 illustrates an example user interface for de-obfuscating an obfuscated message with a link shown as <*> at 202. Any broadcast message reader that supports links may implement such messaging methodology. Upon the reader demonstrating an appropriate level of privileges, the message may be shown in full detail in one embodiment of the present disclosure. The appropriate level of privileges may include one or more criteria specified, for instance, as rules. For example, such criteria may be role-based, institution based, or location-based, or other criteria, or any combinations thereof. Other information that may be legibly obfuscated may include time or identify of a broadcaster. For instance, time specified as "2:12" could be generalized to "around 2", "this afternoon", or specific date which applies to that time. An identity of a person may be obfuscated as follows: a specific name may be generalized as "a resident of XYZ City" or "a resident of ABC state". Any other generalization or obfuscation may be employed.

Figure 3:
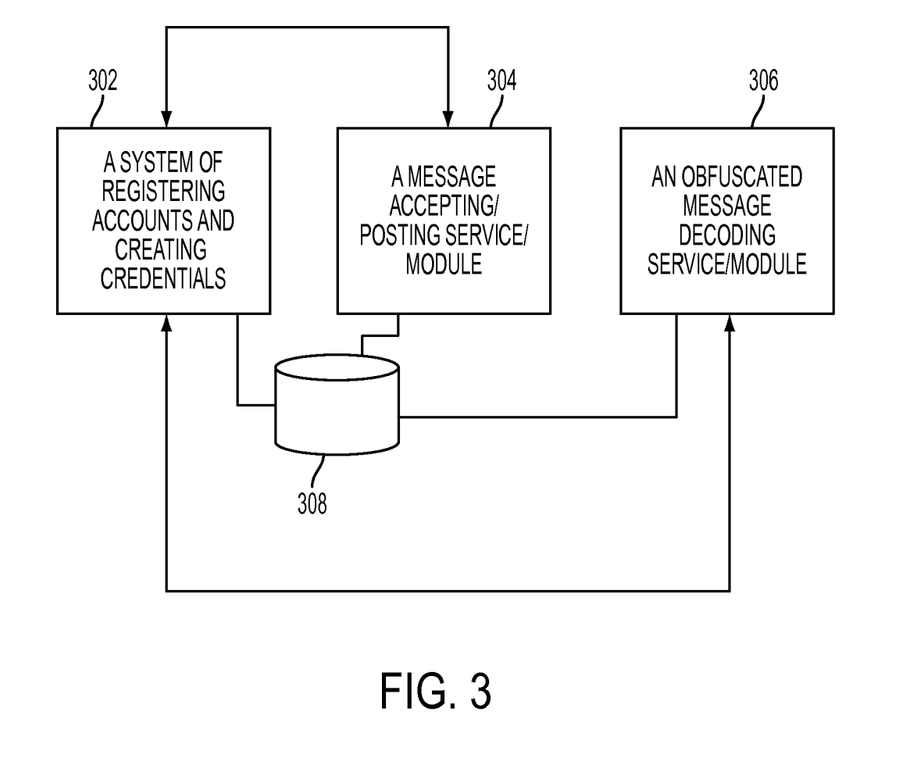
FIG. 3 illustrates the components of such service in one embodiment of the present disclosure.

In one embodiment of the present disclosure, the obfuscating and de-obfuscating of messages may be provided as a set of services. The service may include several components. FIG. 3 illustrates the components of such service in one embodiment of the present disclosure. The service may include a system of registering accounts and creating credentials 302; a service to accept and post the messages 304; and a service to accept requests for obfuscated messages presented with credentials 306.

A registration/credential issuing service 302, in one embodiment of the present disclosure, accepts user's identity information, validates it against any database of identities and roles, and then assigns the user a credential for use when accessing obfuscated messages. The service can store identity information, for instance, in a storage device 308 as database of information, for example, for challenge/response authentication or using traditional web cookie style stored authentication. The service (1) accepts user information; (2) validates it appropriately; (3) creates, stores, and transmits to the user a credential set storing its counterpart in the server, e.g., at 308.

For instance, a user may provide a user identifier such as a user name or account name, and the system may generate a password associated with the user name. The password given to the user may be associated with it a level of sensitivity or a level of generalization or detail the user is allowed to access.

The service may create a user/password pair for a specific user, or a group of users and disseminate it to that user or users. The service deployer (for instance, an entity that employs the service or system of the present disclosure to provide services to users) may provide a mechanism for users to select a username and password and provide them to the service. An example of as user/password pair, might be: "ESEFR/PinkP@nther" which could be provided to the East Side EMS First Responders. A range of credentialing approaches used in the internet, for instance, including hardware based tokens, biometric information and simple user/password pairs may be used. Other credential mechanisms may be used.

A service to accept and post obfuscated messages 304, in one embodiment of the present disclosure, accepts a message or tweet like postings with the information to be obfuscated annotated. In one embodiment, the user can annotate the message directly, by inserting markup into the message. For example a message of "There is a water main break at 317 maple Avenue, with reports of flooding" could be marked "there is a !water main break! Incident at !317 Maple Avenue! with reports of flooding," indicating that the section between "!" exclamation points should be obfuscated. A smart phone application used by the sender may provide a user interface to annotate the obfuscation points, or may insert location information to be obfuscated directly. For instance, a user interface may be provided to enable a user to enter and annotate which part of the messages/texts is to be obfuscated.

In computer mediated markups, an XML markup technique may be used. The following shows an example of a message with parts marked up to be obfuscated:

<message> There is a report of a medical emergency at <obfuscate> 721 East Pine Street unit 4D </obfuscate> Ambulance <obfuscate> unit 47, team 5 </obfuscate> </message>

The above marked up message specifies that "721 East Pine Street unit 4D" and "unit 47, team 5" portions should be obfuscated from the message whose content is, "There is a report of a medical emergency at 721 East Pine Street unit 4D Ambulance unit 47, team 5."

In one embodiment of the present disclosure, the service 304 may store the complete message. The to-be obfuscated portion of the message is stored along with the progressively more generalized information. For instance, if the message contains a complete address portion to be obfuscated, a plurality of associated information may be generated, which information progressively spans from general location information to the detailed location information. In one embodiment of the present disclosure, a provider who is providing the service of the present disclosure may create the list of progressively general to detailed information associated with an item to be obfuscated in a message. For instance, a city government may create a hierarchical list of city regions with a mapping of addresses into the list, for obfuscating addresses from a message. Such a list could be used with a web-based 311 or 911 service for reporting problems associated with severe weather events or other emergencies. As another example, obfuscation may be location-based identity obfuscation (e.g., "a person in uptown" if the address is located in uptown part of a town). Temporal obfuscation could be generic, for instance, specific time may be transformed to time of the day (e.g., "morning", "afternoon", "evening"), day of the week, month, etc.

Generalized information can be inserted directly and automatically (e.g., by the service or module 304) to transform the original message into an obfuscated form, or programmatically, for instance, by looking up the generalized information associated with the to-be obfuscated item in the message. In one embodiment, the generalization may be managed by a set of business rules defined by the service's deployer (e.g., an entity using the techniques of the present disclosure). Such rules may have mechanisms to identify common elements such as addresses, or phone numbers and rules as to appropriate substitution, e.g., for substituting with more generalized forms.

In one embodiment of the present disclosure, the service 304 generates (1) an obfuscated form of the message; (2) A set of one or more progressively more detailed messages; (3) A randomized Uniform Resource Identifier (URI) to be published with the message or the like; (4) The service stores the URI and sets it up to be served up, e.g., by a web server; (5) The service then publishes the message.

In one embodiment of the present disclosure, the URI represents this specific message for purposes of decoding the obfuscated portions during message retrieval. URIs are described by RFC 3986 and RFC 2141. In one embodiment of the present disclosure, the URI refers (directly or indirectly) to an instance of the web service which de-obfuscates the messages. In one embodiment of the present disclosure, the URI includes in its body, sufficient information to permit the service to identify the specific obfuscated message. The URI may appear similar to "link shortening" URIs. An example of an URI may include "https://ems dot obs/i8ef32 dot fwj"; this would point to the web service at "ems.obs" with the payload of "i8ef32.fwj" which would be used to identify the specific obfuscated message.

A service to accept requests for obfuscated messages presented with credentials 306 may publish a web service endpoint which decodes the URI or another obfuscation that was posted, and compares offered credentials to credentials stored in the user service (e.g., at 308), and then returns the message at a level of obfuscation appropriate to the user's access.

On receipt of a web service request to the endpoint (e.g., a site where the message is published for one or more viewers), the obfuscation service may use the payload to identify the specific message in question, along with the credentials (if any) passed on with the request and any other information the requester passed along, such as a location or a status. The obfuscation service may then pass a message at an appropriate level of detail in response to the request. For instance, a viewer or receiver of the message may select the URI link which triggers the obfuscation service to process the message and substitute the obfuscated portion back to an appropriate level of detail (among the generalized hierarchy) or the original message, based on the receiver's credentials.

It should be noted that the database or storage device shown at 308 may exist as a central storage system or as distributed storage system, or in any other structural manner. The methodologies of the present disclosure are not limited to any one specific implementation of the data storage 308.

Figure 4:
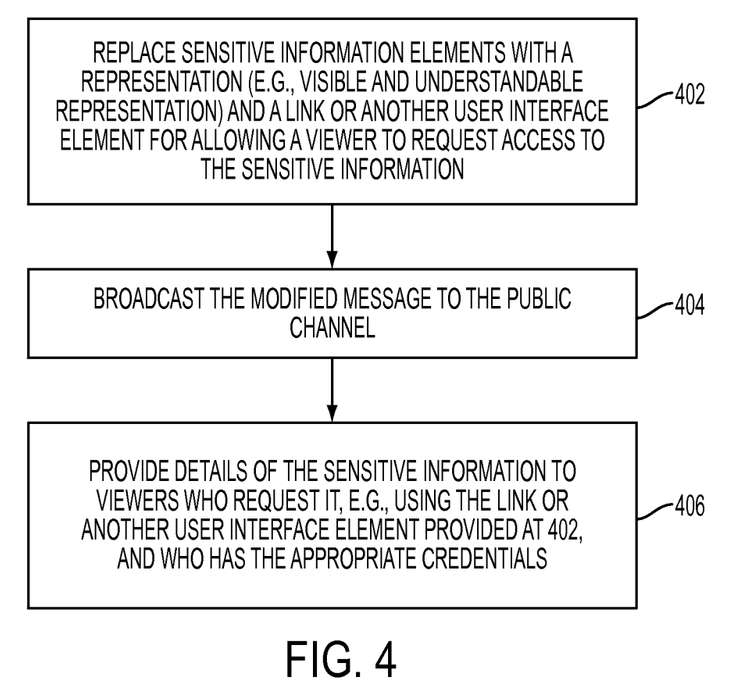
FIG. 4 is a flow diagram illustrating a method of obfuscating potentially sensitive elements of publicly broadcast message in one embodiment of the present disclosure.

FIG. 4 is a flow diagram illustrating a method of obfuscating potentially sensitive elements of publicly broadcast message in one embodiment of the present disclosure. As shown in FIG. 1, an example of potentially sensitive elements may be a street address. Referring to FIG. 4, at 402, the sensitive information elements in the message may be replaced with a representation, e.g., a visible and understandable representation, that preserves more general aspects of the sensitive information (e.g., the neighborhood or district within which the address lies, and/or others) and a link or another user interface element that allows viewers to request access to the details (full details or appropriate levels of details) of the sensitive information.

In one embodiment of the present disclosure, any one or more of the following methods may be used to identify sensitive information in a message. Sensitive information in the broadcast message may be identified automatically; For example, a broadcasting client module may have directly generated the sensitive information, e.g., location or time, and therefore knows its type to be sensitive automatically. Sensitive information in a message may be identified by using rules; For example, a rule by state that "a 3 or 4 digit number followed by a text string that matches a street name is an address"). Sensitive information in a message may be identified by the user selecting textual information and indicating that it is of a particular type; For example, a writer of the message may indicate by using predetermined annotations to specify which parts of the message are sensitive and therefore should be obfuscated. Other methods may be used to detect sensitive information in a broadcast message.

At 404, the modified message having one or more sensitive information elements replaced is broadcast to the public channel. At 406, the details of the sensitive information may be provided to one or more viewers who request it, for example, via the link or another user interface element that is included in the replaced message, if the requesting viewer supplies appropriate credentials, e.g., a password. In one embodiment of the present disclosure, depending on the credential the viewer supplies, more detailed or less detailed information in the hierarchy of information may be shown. In another embodiment, a user in a first responder role such as a police officer or fireman, having been authenticated on an official system, may receive an automatically de-obfuscated version of the message appropriate to their role's level of access. In at another embodiment, contextual information about a user (e.g., their location at time of request) may be used to allow access to sensitive information as permitted by existing rules (e.g., a user located near a burning house should be allowed to know the address of said house).

Thus in one embodiment of the present disclosure, users (e.g., viewers or receivers of the message) may gain access to various levels of sensitive information by establishing that they are a particular individual with appropriate privileges by authenticating themselves with a user ID and password; proving that they are acting in a particular role (e.g., fireman) by having authenticated themselves using that organization's credentials; showing that they are in an appropriate context (e.g., located across the street from a house that has been reported to be on fire) via providing information about their location. Other authentication methods to gain access to different levels of sensitive information may be utilized.

Figure 5:
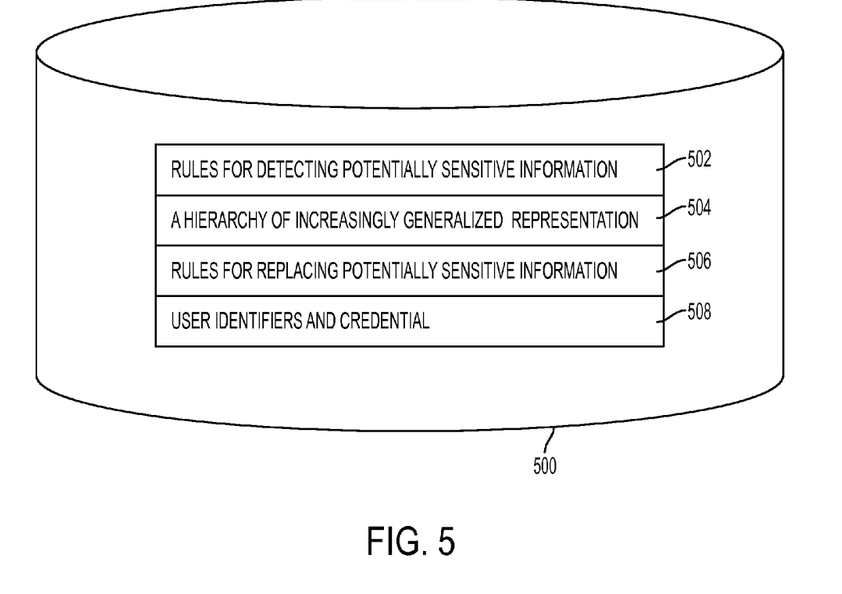
FIG. 5 illustrates data components stored and utilized in one embodiment of the present disclosure.

FIG. 5 illustrates data components stored and utilized in one embodiment of the present disclosure. One or more rules 502 (referred to as first rules) may be provided for detecting potentially sensitive information in a message. Such rules may be stored in a database of rules (e.g., FIG. 3, 308), and retrieved by a service (e.g., FIG. 3, 304) to detect sensitive information in a message. For example, a string of digits followed by a text string that matches a street name may be determined as a street address, which may be identified as sensitive information and thus a candidate for substitution with more general information. A string of three digits, a hyphen, and four more digits may be recognized as a phone number, which may be identified as sensitive information and thus a candidate for substitution with more general information. One or two digits, a colon, and two more digits may be recognized as a time. It is also the case that the broadcast client may directly generate sensitive information—a time stamp or a location—and thus not need to use rules to detect it, since it would know whether the type of information it generated is sensitive information.

There may also be provided a hierarchy of increasingly generalized representations 504 of potentially sensitive information, for example, also stored in a database (e.g., FIG. 3, 308). As an example, the hierarchy of information may be: street address→neighborhood→district→city.

These hierarchies of increasingly generalized information may be retrieved from or generated by various sources. For instance, generalized information may be provided as universal defaults, as in the case of temporal information where 10:22 am can be generalized to "about 10:20 am" which can be generalized to "between 10 and 11 am" which can be generalized to "this morning." The hierarchy of generalization in this example may be:

10:22 am→"about 10:20"→"between 10 and 11"→"this morning"

Others may be provided by pre-existing services. For instance, geocoders such as those offered by Google™ and Yahoo™ or others can provide zip codes and city names given a street address (e.g., http://www dot gpsvisualizer dot com/geocode). Information hierarchies also may be provided by those responsible for deploying the system or service of the present disclosure to a particular locale, for example, using pre-existing information in local geographic information system (GIS) systems. Information hierarchies may be created manually. For instance, those responsible for deploying the system or service of the present disclosure to a particular locale may manually create such information hierarchies.

One or more rules 506 (referred to as second rules) may be provided for replacing potentially sensitive information with a more generalized representation chosen from the hierarchy 504. For instance, the service (e.g., FIG. 3, 304) may utilize the rules 504 and the hierarchy 504 to replace the detected sensitive information from a message with more generalized representation.

Users may be registered and their identifiers may be stored with generated credential information 508. Such information may be utilized to provide properly authenticated viewers with the detailed information that the generalized representation represents. For instance, as explained above with reference to FIG. 3, the registration/credential issuing service 302 may register users and create credentials, and the service 306 to accept requests for obfuscated messages presented with credentials may authenticate and grant access to the full detail of the sensitive information by utilizing the stored user/credential information 508 to de-obfuscate the messages.

The data 502, 504, 506, 508 may be stored as a database or knowledge-base or the like, in one or more storage devices 500, for instance, in a centralized storage or distributed storage.

The obfuscating of messages in one embodiment of the present disclosure does not make data illegible; rather, the obfuscating methodology of the present disclosure maintains the message's intelligibility, for instance, by generalizing the sensitive information, for instance, from a hierarchy of progressively generalized information pertaining to the sensitive information. The obfuscated data in the present disclosure is still correct (correctly describes the information being obfuscated), albeit less precise. The obfuscating of messages in one embodiment of the present disclosure maintains a level of intelligibility to ordinary non-privileged users, for instance, in broadcast messages that are forwarded across many devices and among many parties.

Figure 6:
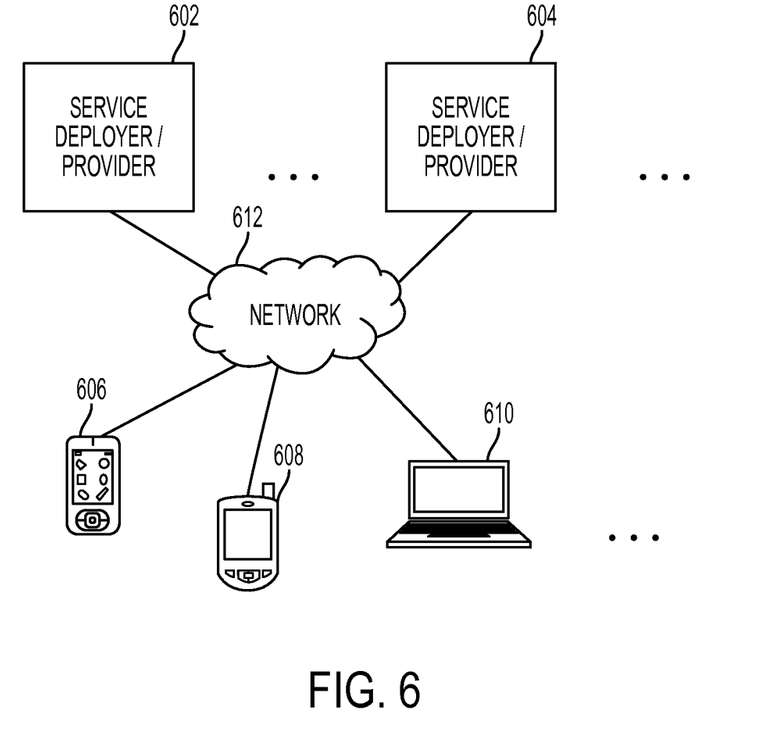
FIG. 6 illustrates an example of a use case of a methodology of the present disclosure in one embodiment.

An example of a use case is illustrated as follows with reference to FIG. 6. A plurality of client devices (e.g., 608,

610, 612) may be utilized to compose and view messages, for instance, in a public or semi-public electronic forum or site provided by one or more service deployer/providers (e.g., 602, 604). An example of a service deployer 602 may be a municipal government that is providing a web site or the like for users (e.g., residents of the municipality) to report events and/or otherwise communicate with the local government.

In one embodiment of the present disclosure, a message composing user that is composing a message to be transmitted, for example, for broadcast to a public or semi-public network (e.g., municipal government web site in this example), may utilize an application software or the like, for example, deployed on a client device (smart phone, personal computer, other devices, e.g., shown at 606, 608, 610) to compose a message. The application software or the like may be, for instance, a smart phone application, a web browser, or others, via which the user may enter information. The entered information is then transmitted to the service deployer (e.g., 602) as a message, for instance, via a communication network 612.

In another embodiment, a message may be composed within the service deployer 602, for instance, a municipal government may be publishing a message on its web site.

A module or the like component at the service deployer 602 may detect one or more sensitive information elements in the message to be broadcast into public or quasi-public computer network environment. The sensitive information elements in the message may have been specified by the user or composer of the message, for instance, by using annotations when entering the message. The client application running on a client device (e.g., 608) may be equipped with techniques for automatically detecting sensitive portions of the message and automatically annotating the user composed message. The sensitive information elements also may be automatically determined, by the module for example at the service deployer 602, based on one or more rules or the like. Any one or more of those methods or other methods may be used to detect sensitive information in the message.

The sensitive information elements in the message may be replaced with a representation that preserves a general aspect of the sensitive information and a user interface element for enabling a receiver of the message to request access to details of the sensitive information. For instance, a module or the like component at the service deployer (e.g., 602) may replace the sensitive information element in the message with a representation that is selected from a hierarchy of generalized information associated with the sensitive information. The replaced message may be then broadcast. For example, the service deployer (e.g., 602) may publish the message along with the user interface element on its web site.

In one aspect, the representation that preserves a general aspect of the sensitive information elements in the message may be generated dynamically based on one or more rules at the time the message is composed for broadcast, for instance, at the client 608 and/or the service deployer 602. In another aspect, the representation that preserves a general aspect of said one or more sensitive information elements may be retrieved from a pre-generated database storing the representation associated with the sensitive information elements.

One or more clients (e.g., 608, 610, 612) accessing that web site now sees the message with the sensitive portion of the message obfuscated or modified with more generalized form of that sensitive information. Consider, for example, a user at the client device 610. That user may request an access to the details of the sensitive information (obfuscated portion), using the user interface element. For example, the user interface element may be a selectable icon, when clicked may prompt the user for the user's credentials, e.g., username/password. The message receiving user is then authenticated and based on the authentication, less general form of the sensitive information or the full details of the sensitive may be presented to the user.

For example, a module or the like at the service deployer 602 may authenticate the user, look up the associated hierarchy of the general to detail information associated with the obfuscated portion of the message, and provide the appropriate level of detail information according to the authentication level of the user, e.g., selected from a hierarchy of generalized information associated with the sensitive information that has been obfuscated. Thus, for example, the receiver of the message at client 610 may see less detailed information than the receiver of the message at client 612, depending on the authorization or authentication level.

Figure 7:
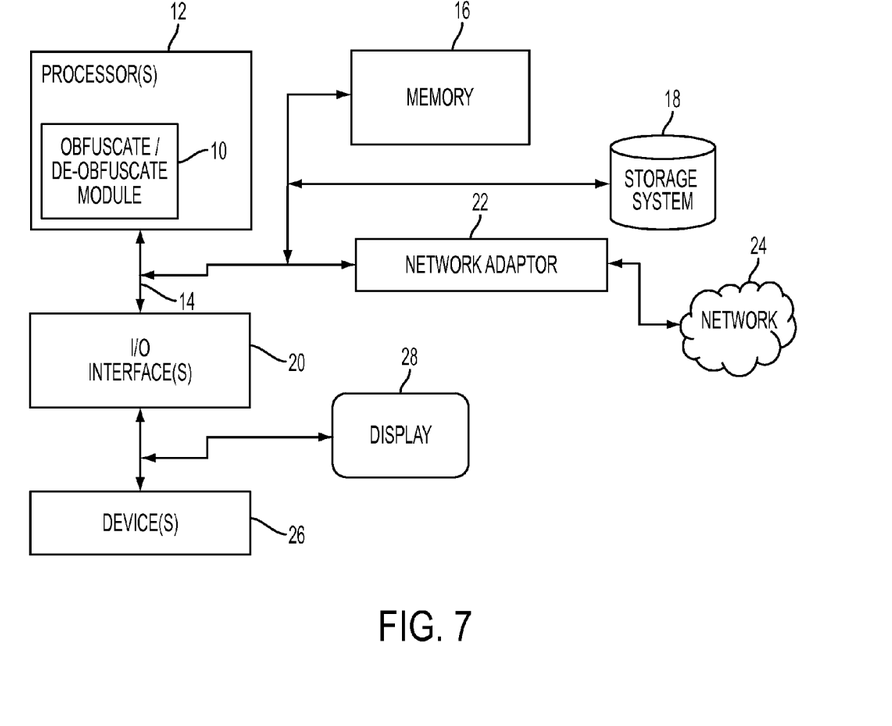
FIG. 7 illustrates a schematic of an example computer or processing system that may implement the obfuscation and de-obfuscation system in one embodiment of the present disclosure.

FIG. 7 illustrates a schematic of an example computer or processing system that may implement the obfuscation and de-obfuscation system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include an obfuscation and de-obfuscation module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for obfuscating elements in a message, comprising:
   detecting one or more sensitive information elements in a message to be broadcast into public or quasi-public computer network environment;
   replacing, by a processor, said one or more sensitive information elements in the message with a representation that preserves a general aspect of said one or more sensitive information elements and a user interface element for enabling a receiver of the message to request access to details of said one or more sensitive information elements; and
   transmitting the replaced message for broadcasting into the public or quasi-public computer network environment,
   the representation that preserves the general aspect of said one or more sensitive information element being meaningfully related to said one or more sensitive information element in a less detailed form,
   at least one of the sensitive information elements represented by a plurality of terms that are in progressively generalized form related to meaning of the sensitive information element, the user interface element associated with a particular sensitive information element.

2. The method of claim 1, wherein said representation is a visible representation.

3. The method of claim 1, wherein said representation is selected from a hierarchy of generalized information associated with said one or more sensitive information elements.

4. The method of claim 1, wherein the user interface element for enabling a receiver of the message to request access to details of said one or more sensitive information elements is a link selectable by said receiver.

5. The method of claim 1, further including:
receiving a request from one or more receivers for details of said one or more sensitive information elements via the user interface element presented in the replaced message;
authenticating said one or more receivers; and
providing full details of said one or more sensitive information elements to said one or more receivers if said one or more viewers are authenticated.

6. The method of claim 5, further including:
registering one or more users with one or more credentials, wherein identifiers of said one or more users are stored with said one or more credentials; and
said authenticating one or more receivers includes receiving one or more credentials associated with said one or more receivers and checking said one or more credentials associated with said one or more receivers with the stored one or more user identifiers and credentials.

7. The method of claim 1, further including:
receiving a request from one or more receivers for details of said one or more sensitive information elements via the user interface element presented in the replaced message;
authenticating said one or more receivers based on a credential provided by said one or more receivers; and
presenting information selected from a hierarchy of generalized information associated with said one or more sensitive information elements, based on the credential.

8. The method of claim 1, wherein the one or more sensitive information elements include information predetermined as being sensitive.

9. The method of claim 1, wherein the one or more sensitive information elements include full location address, telephone number, individual's name, time, or combinations thereof.

10. The method of claim 1, wherein the representation that preserves a general aspect of said one or more sensitive information elements is generated dynamically based on one or more rules at the time the message is composed for broadcast.

11. The method of claim 1, wherein the representation that preserves a general aspect of said one or more sensitive information elements is retrieved from a pre-generated database storing the representation associated with said one or more sensitive information elements.

12. A system for obfuscating elements in a message, comprising:
a processor;
an accounts module operable to generate credentials for users and register the users with associated credentials;
an obfuscating module operable to execute on the processor and further operable to generate an obfuscated form of the message by replacing one or more sensitive information elements in the message with a representation that preserves a general aspect of said one or more sensitive information elements and a user interface element for enabling a receiver of the message to request access to details of said one or more sensitive information elements; and
a de-obfuscating module operable to receive a request from one or more receivers for details of said one or more sensitive information elements via the user interface element, the de-obfuscating module further operable to authenticate said one or more receivers, and further operable to present details of said one or more sensitive information elements to said one or more receivers if said one or more receivers are authenticated;
wherein the user interface element comprises a graphical icon coupled to the representation, and
wherein the representation that preserves the general aspect of said one or more sensitive information element being meaningfully related to said one or more sensitive information element in a less detailed form,
at least one of the sensitive information elements represented by a plurality of terms that are in progressively generalized form related to meaning of the sensitive information element, the user interface element associated with a particular sensitive information element.

13. The system of claim 12, further including a database storing a hierarchy of progressively generalized representations associated with said one or more sensitive information elements, wherein the obfuscating module selects said representation from the hierarchy of progressively generalized representations.

14. The system of claim 12, wherein the obfuscating module dynamically generates said representation based on one or more rules.

15. The system of claim 12, wherein the de-obfuscating module presents different levels of said details associated with said one or more sensitive information elements based on authentication levels of said one or more receivers.

16. The system of claim 12, wherein the obfuscating module selects said representation based on one or more rules.

17. The system of claim 12, wherein the de-obfuscating module presents said details associated with one or more sensitive information elements from a hierarchy of progressively generalized representations.

18. A computer readable storage medium, excluding a signal per se, storing a program of instructions executable by a machine to perform a method for obfuscating elements in a message, comprising:
detecting one or more sensitive information elements in a message to be broadcast into public or quasi-public computer network environment;
replacing, by a processor, said one or more sensitive information elements in the message with a representation that preserves a general aspect of said one or more sensitive information elements and a user interface element for enabling a receiver of the message to request access to details of said one or more sensitive information elements; and
transmitting the replaced message for broadcasting into the public or quasi-public computer network environment.
the representation that preserves the general aspect of said one or more sensitive information element being meaningfully related to the message in a less detailed form,
at least one of the sensitive information elements represented by a plurality of terms that are in progressively generalized form related to meaning of the sensitive information element, the user interface element associated with a particular sensitive information element.

19. The computer readable storage medium, excluding a signal per se, of claim 18, wherein said representation is selected from a hierarchy of generalized information associated with said one or more sensitive information elements.

20. The computer readable storage medium, excluding a signal per se, of claim 18, wherein the user interface element for enabling a receiver of the message to request access to details of said one or more sensitive information elements is a link selectable by said receiver.

21. The computer readable storage medium, excluding a signal per se, of claim 18, further including:
- receiving a request from one or more receivers for details of said one or more sensitive information elements via the user interface element presented in the replaced message;
- authenticating said one or more receivers; and
- providing full details of said one or more sensitive information elements to said one or more receivers if said one or more viewers are authenticated.

22. The computer readable storage medium, excluding a signal per se of claim 21, further including:
- registering one or more users with one or more credentials, wherein identifiers of said one or more users are stored with said one or more credentials; and
- said authenticating one or more receivers includes receiving one or more credentials associated with said one or more receivers and checking said one or more credentials associated with said one or more receivers with the stored one or more user identifiers and credentials.

23. The computer readable storage medium, excluding a signal per se, of claim 18, further including:
- receiving a request from one or more receivers for details of said one or more sensitive information elements via the user interface element presented in the replaced message;
- authenticating said one or more receivers based on a credential provided by said one or more receivers; and
- presenting information selected from a hierarchy of generalized information associated with said one or more sensitive information elements, based on the credential.

24. The computer readable storage medium, excluding a signal per se, of claim 18, wherein the one or more sensitive information elements include information predetermined as being sensitive.

25. The computer readable storage medium, excluding a signal per se, of claim 18, wherein the representation that preserves a general aspect of said one or more sensitive information elements is generated dynamically based on one or more rules at the time the message is composed for broadcast.

* * * * *